United States Patent [19]

Owen et al.

[11] Patent Number: 5,198,194

[45] Date of Patent: Mar. 30, 1993

[54] APPARATUS FOR SIMULTANEOUS HEATING AND COOLING A FAST FLUIDIZED BED CATALYST REGENERATOR

[75] Inventors: Hartley Owen, Belle Meade, N.J.; Paul H. Schipper, Wilmington, Del.

[73] Assignee: Mobil Oil Corporation, Fairfax, Va.

[21] Appl. No.: 793,914

[22] Filed: Nov. 18, 1991

Related U.S. Application Data

[62] Division of Ser. No. 535,459, Jun. 8, 1990, Pat. No. 5,066,627.

[51] Int. Cl.$^5$ .................................... B01J 8/26
[52] U.S. Cl. .................................... 422/144; 208/113; 208/164; 422/146; 422/147
[58] Field of Search ............... 422/146, 144, 147, 145, 422/143, 201; 502/40-44; 208/113, 164

[56] References Cited

U.S. PATENT DOCUMENTS

| | | | |
|---|---|---|---|
| 2,492,948 | 10/1945 | Berger | 252/417 |
| 2,970,117 | 1/1961 | Harper | 252/417 |
| 3,893,812 | 7/1975 | Conner et al. | 23/288 |
| 3,926,778 | 12/1975 | Owen et al. | 208/74 |
| 4,364,849 | 12/1982 | Vickers et al. | 422/144 X |
| 4,430,302 | 2/1984 | Krause | 422/144 |
| 4,578,366 | 3/1986 | Cetinkaya et al. | 208/113 X |
| 4,812,430 | 3/1989 | Child | 502/42 |
| 4,849,091 | 7/1989 | Cabrera et al. | 208/113 |

*Primary Examiner*—Robert J. Warden
*Assistant Examiner*—Amalia Santiago
*Attorney, Agent, or Firm*—Alexander J. McKillop; Malcolm D. Keen; Richard D. Stone

[57] ABSTRACT

A process and apparatus for simultaneously heating and cooling of spent FCC catalyst during regeneration in a high efficiency FCC regenerator, one using a fast fluidized bed coke combustor. The coke combustor burns coke from spent catalyst in a turbulent or fast fluidized bed, and discharges catalyst and flue gas up into a dilute phase transport riser. Catalyst is separated into flue gas and a bubbling dense bed of catalyst. The coke combustor is heated by recycling hot catalyst from the bubbling dense bed and simultaneously cooled by a backmixed heat exchanger. Catalyst flows from the combustor to the cooler and is displaced back into the combustor by adding air to the catalyst in the cooler. Heating promotes rapid coke combustion, while cooling reduces thermal and hydrothermal deactivation of the spent catalyst. High superficial vapor velocities in the cooler promote heat transfer without disrupting flow in the fast fluidized bed coke combustor and without increasing catalyst traffic in the flue gas above the bubbling dense bed.

6 Claims, 3 Drawing Sheets

APPARATUS FOR SIMULTANEOUS HEATING AND COOLING A FAST FLUIDIZED BED CATALYST REGENERATOR

CROSS REFERENCE TO RELATED APPLICATIONS

This is a division of copending application Ser. No. 07/535,459, filed Sep. 8, 1990 now U.S. Pat. No. 5,066,627, issued Nov. 19, 1991.

BACKGROUND OF THE INVENTION

1. Field of the Invention

The invention relates to a process and apparatus for cooling a fast fluidized bed catalyst regenerator used for regeneration of fluidized catalytic cracking catalyst.

2. Description of Related Art

In the fluidized catalytic cracking (FCC) process, catalyst, having a particle size and color resembling table salt and pepper, circulates between a cracking reactor and a catalyst regenerator. In the reactor hydrocarbon feed contacts a source of hot, regenerated catalyst The hot catalyst vaporizes and cracks the feed at 425C-600C, usually 460C-560C. The cracking reaction deposits carbonaceous hydrocarbons or coke on the catalyst, thereby deactivating the catalyst The cracked products are separated from the coked catalyst. The coked catalyst is stripped of volatiles, usually with steam, in a catalyst stripper, and the stripped catalyst is then regenerated The catalyst regenerator burns coke from the catalyst with oxygen containing gas, usually air. Decoking restores catalyst activity and simultaneously heats the catalyst to, e.g., 500C-900C, usually 600C-750C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking has undergone progressive development since the 40s. The trend of development of the fluid catalytic cracking (FCC) process has been to all riser cracking and use of zeolite catalysts. A good overview of the importance of the FCC process, and its continuous advancement, is reported in Fluid Catalytic Cracking Report by Amos A. Avidan, Michael Edwards and Hartley Owen, as reported in the January 8, 1990, edition of the Oil & Gas Journal.

Modern catalytic cracking units use active zeolite catalyst to crack the heavy hydrocarbon feed to lighter, more valuable products. Instead of dense bed cracking, with a hydrocarbon residence time of 20-60 seconds, much less contact time is needed. The desired conversion of feed can now be achieved in much less time, and more selectively, in a dilute phase, riser reactor.

Although reactor residence time has continued to decrease, the height of the reactors has not. The need for a somewhat vertical design to accommodate the great height of the riser reactor and the need to have a unit which is compact, efficient, and has a small "footprint" has caused considerable evolution in the design of FCC units, which evolution is reported to a limited extent in the Jan. 8, 1990, Oil and Gas Journal article One modern, compact FCC design is the Kellogg Ultra Orthoflow converter, Model F, which is shown in FIG. 1 of this patent application, and also shown as FIG. 17 of the Jan. 8, 1990, Oil and Gas Journal article discussed above. The unit uses a regenerator consisting of a bubbling dense bed of catalyst. The regenerator has an external heat exchanger, which allows the unit to process heavy crudes or those containing large amounts of Conradson Carbon Residue material without overheating.

Such cooling of the catalyst regenerator is ancient art. In the 40's many FCC regenerators had external catalyst coolers. With better unit design and more active catalyst the units ran "heat balanced" and did not require catalyst coolers. Today FCC units are being pushed to crack heavier and heavier feeds, which contain large amounts of CCR, so once again catalyst coolers are needed to permit heat balanced operation.

Coolers are now usually connected to the bubbling dense bed of catalyst in the regenerator, as in the Kellogg HOC design. These bubbling dense beds regenerate catalyst and store it until recycled to the riser reactor. Not all regenerators use bubbling dense bed as the primary means of removing carbon from spent catalyst.

The "High Efficiency Regenerator" (H.E.R.) design uses a fast fluidized bed for most of the coke combustion and a dilute phase transport riser for some CO combustion. Regenerated catalyst is collected in a bubbling dense bed for reuse and for recycle to the coke combustor. Such a design makes more efficient use of the catalyst in that the coke combustor is all highly active, unlike bubbling dense bed regenerators, which are troubled with stagnant beds (due to poor catalyst flow patterns) and resignation gas bypassing (due to the formation of large bubbles within the bubbling dense bed) The H.E.R. design uses a turbulent fluidized bed or a fast fluidized bed, which allows use of much less catalyst inventory than is required in a bubbling dense bed regeneration design.

For maximum effectiveness the H.E.R. design requires recycle of hot regenerated catalyst from the bubbling dense bed to the coke combustor of fast fluidized bed (FFB) region to heat it. Heating of the FFB region is beneficial, and usually essential, to rapidly heat up the spent catalyst to a high enough temperature so that coke combustion proceeds rapidly Recycle of regenerated catalyst also creates something of a flywheel effect, and provides a constant source of high temperature catalyst to heat the incoming relatively cooler spent catalyst.

H.E.R. units have, like bubbling bed units, been pushed to deal with the increased carbon burning duties associated with cracking of heavy crudes. The operation of these units has been modified to try to maintain heat balanced operation, either by limiting the heat release during regeneration (partial CO combustion mode) or by removing heat via heat exchange.

A partial combustion route to limiting heat release is disclosed in U.S. Pat. No. 4,849,091, which is incorporated herein by reference. Such an approach allows some of the heat release to be shifted to a downstream CO boiler.

Adding heat exchangers to H.E.R. regenerators in various ways has been reported in the patent literature. Most of the heat exchangers are connected to the bubbling dense bed associated with the H.E.R. regenerator.

In U.S. Pat. No. 4,439,533 a backmixed heat exchanger is added to the bubbling dense bed of catalyst. There are no slide valves or elaborate catalyst supply and return lines to the heat exchanger, rather the heat exchanger is closely coupled, and in open fluid communication with the bubbling dense bed. The backmixed heat exchanger looks something like a thimble, and for convenience such a backmixed, close coupled heat exchanger which is in open fluid communication with a catalyst regeneration zone may be hereafter referred to as a "thimble" heat exchanger. Adjustment of the amount of fluidizing gas added to the "thimble" containing the heat exchange tubes allows control of catalyst circulating in the thimble and of heat exchange Cooling fluid, usually water, has passed through a tube bundle within the thimble. Cooled catalyst is returned to the bubbling dense bed regenerator.

In U.S. Pat. No. 4,434,245 a flow-through heat exchanger is supplied having a hot catalyst inlet in the bubbling dense bed, and a cooled catalyst outlet in the coke combustor or FFB region. This approach requires a significant amount of hardware modifications, slide valves, and a fluidizing air outlet from the upper portion of the heat exchanger to the dilute phase region above the bubbling dense bed.

In U.S. Pat. No. 4,578,366 a flow-through heat exchanger is used, with fluidizing gas used in the heat exchanger also being used to support combustion in the coke combustor. Catalyst slide valves are shown for regulating the flow of hot regenerated catalyst from the bubbling dense bed into the heat exchanger.

In U.S. Pat. No. 4,595,567 a flow-through heat exchanger is used, with heat pipes in the heat exchanger. Catalyst slide valves regulate the flow of hot regenerated catalyst from the bubbling dense bed into the heat exchanger.

Only one reference is known with a heat exchange means within, or connected to, the fast fluidized bed region of an H.E.R. In U.S. Pat. No. 4,430,302 a fast fluidized bed regenerator (without catalyst recycle) is shown with looped heat exchange coils within the fast fluidized bed. Looped coils formed from 1 ½ or 2" 304H stainless steel were suspended in multiple banks within a reaction vessel having a substantially vertical sidewall. The length of horizontal sections of heat exchange tube was minimized to minimize erosion of the tubes.

We reviewed this extensive art on putting coolers around FCC regenerators but found nothing that was completely satisfactory.

We wanted to avoid use of slide valves to control catalyst flow to the regenerator. These can cost more than $1,000,000 each and are usually used in pairs to permit servicing.

We wanted to avoid coils within the FFB region of the regenerator. Cooling coils must always be full of coolant (to avoid thermal shock and damage to the tubes). Coils full of coolant will remove heat even during startup, when the unit requires heating, not cooling. There is concern too that coils may interfere with fluidization within the FFB region.

We needed a reliable and efficient way of removing heat from an FFB regenerator during normal operation, which could be safely isolated from the FFB region during startup. We wanted to make double use of any gas added to the heat exchanger to promote fluidization, i.e., use it once to control the heat transfer coefficient in the heat exchanger, and use it again to supply combustion air.

We wanted a way to limit as much as possible the temperature rise experienced by spent catalyst particles in FFB regenerators. We wanted more than a heat sink which would absorb heat from regenerating catalyst in the riser above the FFB. We needed a way to cool at least some of the catalyst during the regeneration process.

We also wanted to have the option to remove some heat from the coke combustor, without "linkage" to the amount of catalyst recycle. Although catalyst recycle to the coke combustor is usually essential to "fire up" the coke combustor, it causes some problems Catalyst recycle from the bubbling dense bed to the FFB increases the solids traffic in the dilute phase region above the bubbling dense bed, and this can cause increased emissions of particulates. Large amounts of catalyst recycle require work in raising and lowering of tons of catalyst from the FFB region to the second dense bed. Catalyst recycle also dilutes the carbon on catalyst content in the coke combustor which, although beneficial in limiting temperature rise, makes it harder to achieve low levels of carbon on regenerated catalyst. Coke burns quickly when the apparent carbon concentration on catalyst is high, and slowly when carbon concentration is low.

We realized that putting a catalyst cooler beneath but in open fluid communication with the fast fluidized bed region we could obtain several benefits. The benefits can be summarized as higher heat transfer rates, multiple use of air, reduced temperature rise downstream of the coke combustor, and some cooling of partially regenerated catalyst during the regeneration process We discovered that a backmixed cooler beneath the fast fluidized bed region can also give higher heat transfer rates than a backmixed cooler connected to a bubbling dense bed.

BRIEF SUMMARY OF THE INVENTION

Accordingly, the present invention provides a process for the simultaneous heating and cooling of coked fluidized catalytic cracking catalyst during high efficiency regeneration in a fast fluidized bed regeneration zone which comprises: decoking coked fluidized catalytic cracking catalyst by contact with an oxygen-containing regeneration gas in a coke combustor operator at coke combustion conditions, including a coke combustor temperature and a superficial vapor velocity sufficient to maintain said catalyst as a fast fluidized bed in said coke combustor and to at least partially decoke said catalyst to produce a dilute phase mixture of at least partially decoked catalyst and flue gas and; discharging said dilute phase mixture up through a dilute phase transport riser and separating said dilute phase mixture to form a flue gas phase with reduced catalyst content and a bubbling dense phase fluidized bed of catalyst having a higher temperature than the coke combustor temperature--characterized by simultaneously heating said coked catalyst in said coke combustor by direct contact heat exchange with catalyst from said bubbling dense bed by recycling to said coke combustor at least a portion of the catalyst from said bubbling dense bed to form a dense phase mixture of recycled and coked catalyst; and cooling said dense phase mixture in said coke combustor by allowing at least a portion of said dense phase mixture of recycled and coked catalyst to flow down from said coke combustor to a heat removal zone extrinsic from said coke combustor and cooling said dense phase mixture in said extrinsic heat removal zone by indirect heat exchange with a cooling fluid to produce a cooled dense phase catalyst mixture and fluidizing said dense phase catalyst mixture in said heat removal zone by passage of a fluidizing gas in direct contact with said dense phase catalyst mixture, said fluidizing gas being added in an amount sufficient to provide a superficial vapor velocity sufficient to cause said dense phase catalyst mixture to flow up from said extrinsic cooler to said coke combustor.

In an apparatus embodiment, the present invention provides an apparatus for the simultaneous heating and cooling of coked fluidized catalytic cracking catalyst during high efficiency regeneration in a fast fluidized bed regeneration zone which comprises: a coke combustor having an inlet for coked fluidized catalyst cracking catalyst, an inlet for oxygen-containing regeneration gas, an inlet for a recycled regenerated catalyst stream, and an outlet in an upper portion thereof adapted to discharge a dilute phase mixture of catalyst and regeneration gas from said coke combustor; a dilute phase transport riser having an inlet in a lower portion thereof connected to said coke combustor and an outlet in an upper portion thereof connected with a catalyst-/gas separation means; said catalyst/gas oxygen-containing regeneration gas in a coke combustor operating catalyst/gas stream and discharge resulting separated catalyst in a collection vessel adapted to maintain said separated catalyst as a bubbling dense phase fluidized bed of catalyst characterized by: a catalyst recycle means adapted to recycle separated catalyst from said bubbling dense bed to said coke combustor; and a generally vertical extrinsic heat removal means, having a height and an equivalent diameter, beneath and in open fluid communication with said coke combustor, said heat removal means connected to said coke combustor by an inlet tube having a length no greater than the height of said extrinsic heat removal means and inlet tube equivalent diameter equal to at least 75% of the equivalent diameter of said extrinsic heat removal means, said heat removal means further comprising at least one fluidizing gas inlet means in a lower portion thereof adapted to add fluidizing gas to said extrinsic heat removal means in an amount sufficient to fluidized and displace catalyst from said heat removal means up into said coke combustor via said inlet tube.

DESCRIPTION OF PREFERRED EMBODIMENTS

Figure 1:
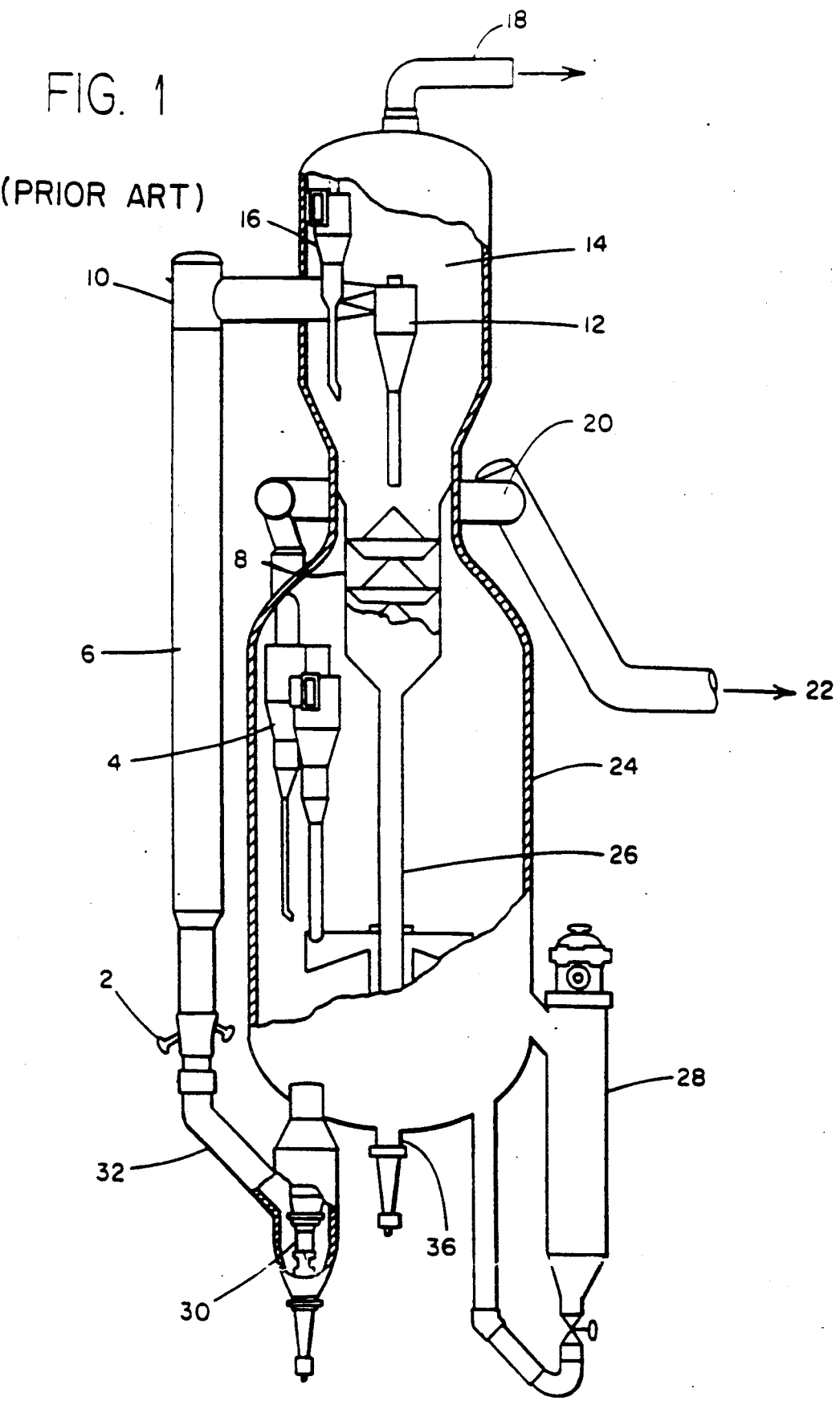
FIG. 1 (prior art) is a schematic view of a conventional, bubbling dense bed regenerator in a fluidized catalytic cracking unit.

FIG. 1 is a simplified schematic view of an FCC unit of the prior art, similar to the Kellogg Ultra Orthoflow converter Model F shown as FIG. 17 of Fluid Catalytic Cracking Report in the Jan. 8, 1990, edition of Oil and Gas Journal.

A heavy feed such as a gas oil, vacuum gas oil is added to riser reactor 6 via feed injection nozzles 2. The cracking reaction is completed in the riser reactor, which takes a 90° turn at the top of the reactor at elbow 10. Spent catalyst and cracked products discharged from the riser reactor pass through riser cyclones 12 which efficiently separate most of the spent catalyst from cracked product. Cracked product is discharged into disengager 14, and eventually is removed via upper cyclones 16 and conduit 18 to the fractionator.

Spent catalyst is discharged down from a dipleg of riser cyclones 12 into catalyst stripper 8, where one, or preferably 2 or more, stages of steam stripping occur, with stripping steam admitted by means not shown in the figure. The stripped hydrocarbons and stripping steam pass into disengager 14 and are removed with cracked products after passage through upper cyclones 16.

Stripped catalyst is discharged down via spent catalyst standpipe 26 into catalyst regenerator 24. The flow of catalyst is controlled with spent catalyst plug valve 36.

Catalyst is regenerated in regenerator 24 by contact with air, added via air lines and an air grid distributor not shown. A catalyst cooler 28 is provided so that heat may be removed from the regenerator, if desired. Regenerated catalyst is withdrawn from the regenerator via regenerated catalyst plug valve assembly 30 and discharged via lateral 32 into the base of the riser reactor 6 to contact and crack fresh feed injected via injectors 2, as previously discussed. Flue gas, and some entrained catalyst, are discharged into a dilute phase region in the upper portion of regenerator 24. Entrained catalyst is separated from flue gas in multiple stages of cyclones 4 and discharged via outlets 8 into plenum 20 for discharge to the flare via line 22.

Figure 2:
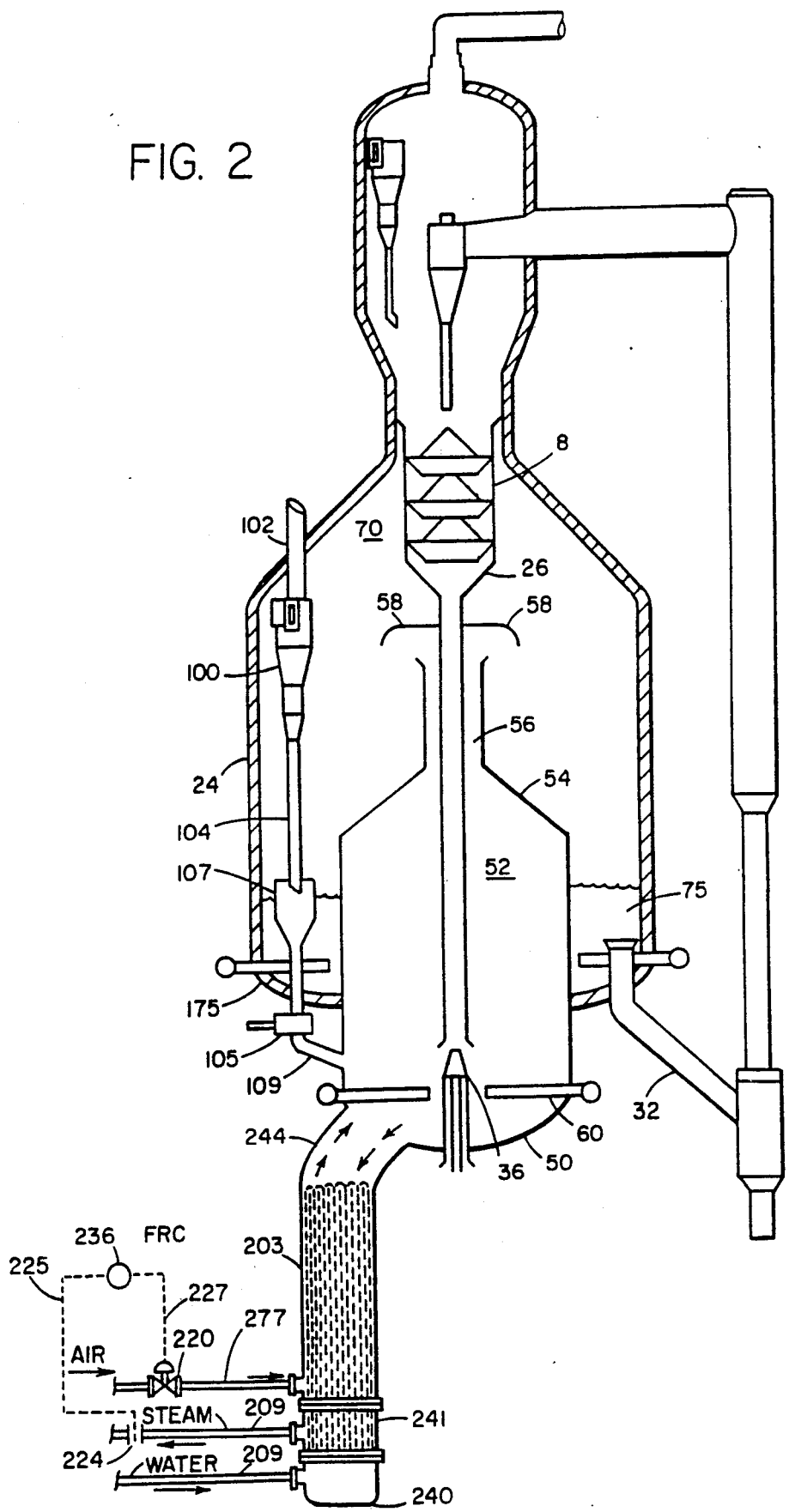
FIG. 2 (invention) is a schematic view of a regenerator of the invention with an FFB region added to the regenerator and a "thimble" heat exchanger beneath the FFB region.

In FIG. 2 (invention) only the changes made to the old regenerator shell 24 are shown. Like elements in FIG. 1 and 2 have like numerals. It should be noted that the FFB region 50, per se, forms no part of the present invention. Region 50 is the subject of copending U.S. Ser. No. 515930, which is incorporated by reference. The invention is addition of a "thimble" heat exchanger beneath this FFB region.

A high efficiency regenerator pod 50 is added to the base of, or passes through, the base of the old regenerator vessel 24. Stripped catalyst from the catalyst stripper 8 is discharged via stripper dipleg 26 down into regenerator pod 50. The catalyst is discharged into a fast fluidized bed region 52 where incoming spent catalyst contacts regeneration gas, usually air, added via multiple inlets 60. Although only a single level of air admission is shown, it is possible to add air at many places in the design, ranging from the very bottom of the FFB region in vessel 52 to multiple elevations of air injection within vessel 52, or near the top of vessel 52.

In vessel 52 the air admission rate, and the cross-sectional area available for flow, and catalyst addition and catalyst recycle, if any, are adjusted to maintain much or all of the bed in a "fast fluidized condition," characterized by intense agitation, relatively small bubbles, and rapid coke combustion. In terms of superficial vapor velocity and typical FCC catalyst sizes, this means the vapor velocity should exceed 3.5 feet per second, and preferably is 4–15 feet per second, and most preferably is 4–10 feet per second. The catalyst density in a majority of the volume in the coke combustor will be less than 35 pounds/cubic foot, and preferably less than 30 pounds/cubic foot, and ideally about 25 pounds/cubic foot, and even less in the upper regions of the coke combustor, where the diameter of the vessel decreases, as indicated generally at 54.

The densities and superficial vapor velocities discussed herein presume that the unit operates at a pressure where the vast majority of FCC units operate, namely 25–40 psig. A few might operate at slightly lower pressures, and a significant minority may operate at somewhat higher pressures, primarily those with power recovery systems. Changes in pressure change the superficial vapor velocity needed to maintain, e.g., a fast fluidized bed or a bubbling dense bed. It is easy to calculate the superficial vapor velocity needed to support a given type of fluidization, and the bed density expected at those conditions. In general, an increase in pressure will decrease the superficial vapor velocity needed to achieve a fast fluidized bed.

The partially regenerated catalyst and partially consumed combustion gas are discharged out the top of the coke combustor into transition region 54 and from there into a dilute phase transport riser 56, which preferably forms an annulus around the spent catalyst standpipe, as shown in the Figure. Dilute phase conditions promote rapid combustion of CO to $CO_2$, although some additional coke combustion can also be achieved here. Addition of secondary air to the base of the transport riser or at higher elevations therein by means not shown can also be practiced to augment coke or CO combustion. The catalyst and flue gas are discharged into the existing dilute phase space above the prior art dense bed. Preferably a catalyst/flue gas separation means, shown generically as downwardly directing arms or cap 58, is used to separate the bulk of the catalyst from the bulk of the flue gas and reduce to some extent the catalyst traffic in the dilute phase region 70. Riser cyclones or a cap 58 much like a bubble cap on a distillation column can be used to achieve the desired catalyst separation. Cyclones can easily achieve greater than 99% separation, but they are expensive and difficult to retrofit. A bubble cap or downward extending sidearms can achieve separations of around 90% which will be satisfactory in this service.

The hot, at least partially regenerated, catalyst is collected as a dense phase fluidized bed 75 in the base of the existing regenerator shell 24. Additional regeneration gas is preferably added via air distributor means 175.

It is beneficial, and usually essential, to recycle some hot regenerated catalyst from bed 75 to the fast fluidized bed region in vessel 52. Catalyst recycle is usually needed to "fire up" the coke combustor and achieve the high temperatures needed in the coke combustor for efficient coke combustion and to promote afterburning in the dilute phase transport riser. Recycle of hot regenerated catalyst:spent catalyst in ratios ranging from 0.5:1 to 10:1 usually provides good results. Such recycle can also be from the dipleg 104 of a primary cyclone, such as cyclone 100, as shown in the drawing. Flue gas is removed from the unit via line 102 while catalyst is discharged from the cyclone into funnel collector 107. Any catalyst not recycled simply overflows into bed 75. This arrangement is beneficial for high temperature and head.

Regenerated catalyst for reuse in the cracking process is withdrawn from dense bed region 75 via plug valve means or a slide valve not shown and transferred to the cracking reactor via line 32.

FIG. 2 shows heat removal from the FFB region 52 via "thimble" heat exchange means 203, which is generally vertical. The catalyst is on the shell side and the heat exchange medium passes through the tubes via lines 209 and 209'. The preferred heat exchange medium is water, which turns to steam when passing through the tubes. The tube bundle in the heat exchanger is preferably of the "bayonet" type wherein one end of the bundle is unattached, thereby minimizing problems due to the expansion and contraction of the heat exchanger components. The heat transfer that occurs is from the catalyst, through the tube walls and into the heat transfer medium. The bottom of the shell is sealed to catalyst flow, and the top of the shell is in sealed communication with the bottom portion of the coke combustor 50, a fast fluidized bed region. The level of the fast fluidized bed of catalyst will always be above the opening into the inlet 249 of the neat exchanger, and the catalyst may, thus, freely backmix and circulate to and from the heat exchanger and the FFB region. Fluidizing gas, preferably air, is passed into a lower portion of the shell side of heat exchanger 203 via line 277, thereby maintaining a dense phase or a turbulent or a fast fluidized bed of catalyst in the shell side of the heat exchanger and promoting turbulent backmixing and flow to and from the coke combustion zone. Control valve 220 in line 277 allows more or less air to be added to increase or decrease the amount of heat removed in the heat exchanger. Catalyst does not leave the system via the external heat exchanger, thus keeping the catalyst loading on the regenerator constant to achieve cooling without disrupting operation of the fast fluidized bed coke combustors.

Normal flow patterns from the coke combustor to the exchanger, as modified by variable amounts of air addition via line 277, allow sufficient backmixing within the heat exchanger at reasonable superficial gas velocities to totally dispense with a net catalyst flow requirement. This may require more air than a similar system with a flow-through heat exchanger but eliminates the expensive lower standpipe, expansion joint and slide valve requirements. The air is not wasted, however; it satisfies some of the requirement for combustion air in the coke combustor. The generally higher air rates increase the heat transfer coefficient directly by affecting the superficial velocity over the heat exchanger tubes and indirectly by influencing the extent of mass flow of catalyst from the fast fluidized bed through the heat exchanger. The higher mass flow will result in a higher heat exchanger duty also because the average catalyst temperature in the heat exchanger will be higher, thereby providing a higher temperature difference (DELTA T) to which the amount of heat transfer is directly proportional.

The figure shows a preferred embodiment of heat exchanger 203 and the manner of the interconnection of heat exchanger 203 with fast fluidized bed region 52. Heat exchanger 203 is shown with the shell side completely filled with fluidized catalyst. Extremely high superficial vapor velocities may be used which will increase catalyst traffic in the coke combustor and increase the heat transfer coefficient in the heat exchanger. without increasing catalyst traffic in the dilute phase region above the bubbling dense bed. Fluidizing air may be added to the heat exchanger shell at one or more points in the shell in addition to that shown. All air added rises and flows into the coke combustor.

Figure 3:
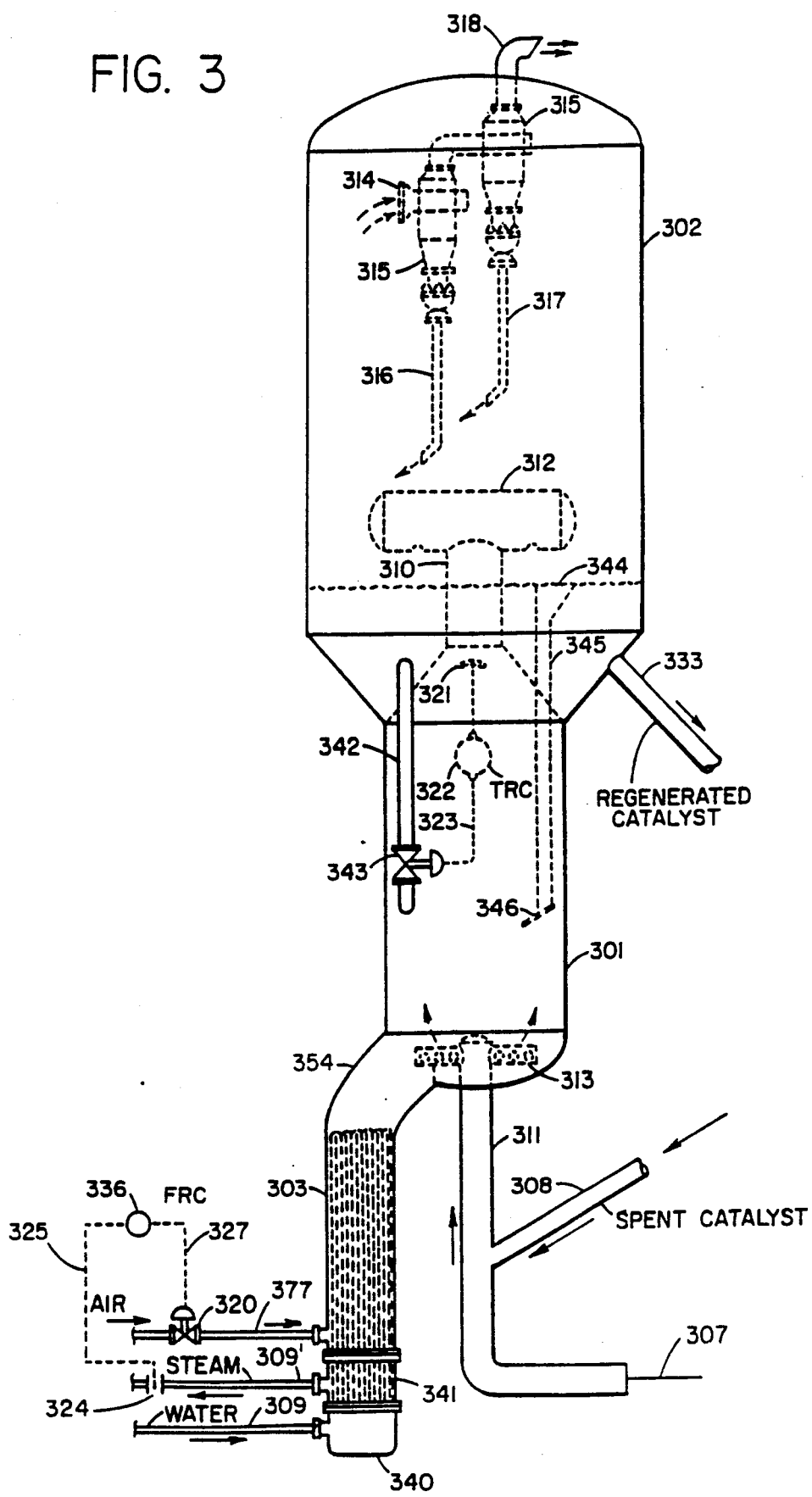
FIG. 3 is a schematic view of a preferred embodiment of the invention, showing a "thimble" cooler beneath the coke combustor of an H.E.R. regenerator.

Although not necessary, it is also possible to remove heat from other regions in the regenerator, i.e., to have heat exchangers associated with the bubbling dense bed, the recycle line to the FFB region, on the standpipe from a cyclone separator, or on the return line to the reactor. These can all be beneficial, but none are essential for the practice of the present invention. The present invention requires only a heat exchange "thimble", i.e., a heat exchange vessel connected with, and open to, the FFB region. Catalyst flows into such a thimble because the thimble is at a lower elevation than the FFB region. Catalyst is displaced from the thimble by the action of the fluidizing gas added to the base of the thimble, In FIG. 3 a heat exchange thimble is added to the FFB region of a H.E.R. regenerator. Although any H.E.R. regenerator can be used, the one shown in FIG. 3 is a modification of the unit shown in U.S. Pat. No. 4,439,533.

As used herein, the term "hot regenerated catalyst" means regenerated catalyst at the temperature leaving the combustion zone, from about 1300 to about 1400° F., while the term "cool regenerated catalyst" means regenerated catalyst at the temperature leaving the cooling zone, the latter of which is about 200° F. less than the temperature of the hot regenerated catalyst. There will be a temperature gradient at the bottom of the disengagement zone, with the coolest catalyst being approximate to the opening to the heat removal zone and the hottest catalyst being at the portion of the bottom of the disengagement zone furthest from such opening.

In FIG. 3 regeneration gas, which may be air or another oxygen-containing gas, enters in line 307 and mixes with coke contaminated catalyst entering in conduit 308. These streams are shown as flowing together into mixing conduit 311, although each stream could flow individually into combustion zone 301. The resultant mixture of coke contaminated catalyst and regeneration gas are distributed into the interior of combustion zone 301, at a lower locus thereof, via conduit 311 and distributor 313. Coke contaminated catalyst commonly contains from about 0.1 to about 5 wt. % carbon, as coke. It can contain from about 5 to about 15 wt. % hydrogen, as well as sulfur and other materials. The regeneration gas and entrained catalyst flows upward from the lower part of combustion zone 301 to the upper part thereof in dilute phase. The term "dilute phase," as used herein, shall mean a catalyst/gas mixture of less than 30 lbs/ft3, and "dense phase" shall mean such mixture equal to or more than 30 lbs/ft3. Dilute phase conditions, that is, a catalyst/gas mixture of less than 30 lbs/ft3, and typically 2-10 lbs/ft3, are the most efficient for coke oxidation. As the catalyst/gas mixture ascends within transport riser 310, the heat of combustion of coke and CO is absorbed by the catalyst.

The rising catalyst/gas system flows through passageway 310 and impinges on surface 312, which impingement changes the direction of flow of the stream. The impingement of the catalyst/gas stream upon surface 312 causes almost all of the hot regenerated catalyst flowing from the combustion zone to disengage from the flue gas and fall to the bottom portion of disengagement zone 302 which comprises a hot particle collection chamber or fluid particle collection section. The catalyst collection area of the disengagement zone may be a cone-shaped, annular receptacle, as shown, or any other shape appropriate for collecting catalyst particles. The gaseous products of coke oxidation and excess regeneration gas, or flue gas, and the very small uncollected portion of hot regenerated catalyst flow up through disengagement zone 302 and enter cyclone separation means 315 through inlet 314. Any other effective means for the separation of catalyst from a gas stream can also be used. Catalyst separated from the flue gas is discharged from the cyclones via standpipe 316 and 317 to the bottom of disengagement zone 302. The flue gas exits via conduit 318.

Heat exchanger 303 is vertical, with the catalyst in the shell side and the heat exchange medium, preferably water, passing through the tubes via lines 309 and 309'. The level of the fast fluidized catalyst will always be above the opening into the inlet 354 of the heat exchanger, so the catalyst may freely backmix. Fluidizing gas, preferably air, is passed into a lower portion of the shell side of heat exchanger 303 via line 377, thereby promoting turbulent back mixing and flow to and from the coke combustion zone. Control valve 320 in line 377 allows more or less air to be added to increase or decrease the amount of heat removed in the heat exchanger. Catalyst does not leave the system via the external heat exchanger, thus keeping the catalyst loading on the regenerator constant to achieve cooling without disrupting operation of the fast fluidized bed coke combustors.

FIG. 3 shows a preferred embodiment, with the shell side of heat exchanger 303 filled with fluidized catalyst. Extremely high superficial vapor velocities may be used to increase catalyst traffic in the coke combustor and increase heat transfer in the heat exchanger. Fluidizing air may be added to the heat exchanger shell at one or more points in the shell. All air added rises and flows into the coke combustor.

A typical configuration of tubes in the bayonet-type bundle would be one inch tubes each ascending from inlet manifold 340 in the head up into the shell through a three inch tube sealed at its top, each one inch tube emptying into the three inch tubes in which it is contained just below the sealed end of the three inch tube. A liquid, such as water, would be passed up into the one inch tubes, would empty into the three inch tubes, would absorb heat from the hot catalyst through the wall of the three inch tubes as it passed downward through the annular space of the three inch tubes and would exit the heat exchanger, at least partially vaporized, from outlet manifold 341 in the head. It is important to keep heat exchanger 303 at an elevation, and with an opening large enough, so that catalyst can freely enter the heat exchanger from fast fluidized bed region 301.

Hot regenerated catalyst is removed from the regenerator via line 333. Preferably at least a portion of the hot regenerated catalyst is circulated to the combustion zone via external conduit 342 and control valve 343. Also shown is dipleg or standpipe 345 with bottom flapper valve 346 and upper weir 344. Catalyst can overflow weir 344 and fill dipleg 345. When the force exerted by the head of catalyst filling dipleg 345 on flapper valve 346 exceeds that pressure required to open valve 346, i.e. overcome the force exerted by the spring or counterweight holding the valve closed, catalyst will flow from the dipleg into combustion chamber 301. The flapper valve and/or head of catalyst in the dipleg prevent reversal of flow up the dipleg.

The control system discussed in U.S. Pat. No. 4,439,533 may be used herein, if desired. This regulated the amount of catalyst flowing through conduit 342 using means 321 to sense the temperature in the inlet to the dilute phase transport riser, as shown. Temperature control means 322 develops an output signal which is transmitted via means 323 to control valve 343, whereby catalyst recycle may be adjusted responsive to the temperature at the upper portion of combustion zone 301.

Although FIG. 3 uses a single heat exchanger, two or more heat exchangers side by side or at different elevations may be used.

Control of the duty of heat exchanger 303 may be achieved by controlling the quantity of fluidizing gas in line 377. The quantity of steam generated and flowing through line 309' may be measured by meter 324 which transmits a signal via means 325 to flow control means 336. The latter controls valve 320 via means 327. For simplicity meter 324 is shown as an orifice meter in line 309, but in practice there may be liquid and gas phases in line 309' which have to be separated in a "steam drum", with the steam rate measured after separation. Flow control means 336 may comprise an analogue or digital computer capable of selecting the optimum amount of fluidizing gas. The flow of fluidizing gas to the shell side of heat exchanger 303 will affect the turbulence and mass flow of the FCC catalyst, which in turn regulates the heat transfer coefficient across such surfaces and thus the quantity of heat transfer.

The "thimble" heat exchanger, controlled in this way, provides a controllable way to remove a constant amount of heat from the coke combustor and provide a constant quantity of high pressure steam.

The quantity of fluidizing gas to the shell side of the heat exchanger may also be adjusted to control a temperature in or around the coke combustor. For this mode, of course, the quantity of steam generated would vary, but the coke combustor operation will be more stable.

DESCRIPTION OF PREFERRED EMBODIMENTS FCC FEED

Any conventional FCC feed can be used. The process of the present invention is especially useful for processing difficult charge stocks, those with high levels of CCR material, exceeding 3, 3, 5 and even 10 wt % CCR.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resides, and vacuum resids, and mixtures thereof. The present invention is most useful with feeds having an initial boiling point above about 650° F.

The most uplift in value of the feed will occur when a significant portion of the feed has a boiling point above about 1000° F. or is considered non-distillable and when one or more heat removal means are provided in the regenerator, as shown in FIG. 1 or in FIG. 3.

FCC CATALYST

Any commercially available FCC catalyst may be used. The catalyst can be 100% amorphous but preferably includes some zeolite in a porous refractory matrix such as silica-alumina, clay, or the like. The zeolite is usually 5-40 wt. % of the catalyst, with the rest being matrix. Conventional zeolites include X and Y zeolites, with ultra stable or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 Wt RE.

Relatively high silica zeolite containing catalysts are preferred for use in the present invention. They withstand the high temperatures usually associated with complete combustion of CO to $CO_2$ within the FCC regenerator.

The catalyst inventory may also contain one or more additives, either present as separate additive particles, or mixed in with each particle of the cracking catalyst. Additives can be added to enhance octane (shape selective zeolites, i.e., those having a Constraint Index of 1-12, and typified by ZSM-5, and other materials having a similar crystal structure), adsorb SOX (alumina) and remove Ni and V (Mg and Ca oxides).

Good additives for removal of SOx are available from several catalyst suppliers, such as Davison's "R" or Katalistiks International, Inc.'s "DeSox."

CO combustion additives are available from most FCC catalyst vendors.

The FCC catalyst composition, per se, forms no part of the present invention.

CRACKING REACTOR/STRIPPER/REGENERATOR

The FCC reactor, stripper and regenerator shell 24, per se. are conventional, and are available from the M. W. Kellogg Company.

The modifications needed to add the combustor pod or FFB region within or built partially into the base of the existing regenerator shell 24 are well within the skill of the art.

COMBUSTOR POD PROCESS CONDITIONS

Conditions in the combustor pod or FFB region and in the dilute phase transport riser contiguous with and above it are very similar to those used in conventional High Efficiency Regenerators (HER) now widely used in FCC units. Typical H.E.R. regenerators are shown in U.S. Pat. Nos. 4,595,567 (Hedrick), 4,822,761 (Walters, Busch and Zandona) and U.S. Pat. No. 4,820,404 (Owen), which are incorporated herein by reference.

The conditions in the combustor pod comprise a turbulent or fast fluidized bed region in the base, and approach dilute phase flow in the upper regions thereof. These conditions are conventional; what is unconventional is providing a heat exchanger beneath, and in open fluid communication with, the fast fluidized bed region of the regenerator with a superimposed catalyst stripper discharging spent catalyst down directly into the regenerator via a standpipe within the dense bed regeneration vessel.

"THIMBLE" HEAT EXCHANGE

The process and apparatus of the present invention require a heat removal zone extrinsic from the fast fluidized bed region, but which is in open fluid communication therewith. In the intensely fluidized bed, catalyst flows readily down into said heat removal zone, where it can be cooled by indirect heat exchange. Indirect heat exchange can be conventional, as by heat exchange through tubes with a coolant such as steam or boiler feed water. It usually will be preferred to put the catalyst from the coke combustor in the "shell" or thimble and have the coolant in tubes, but it is also possible to reverse this and have one or more tubes immersed in shells containing coolant.

Unusually high heat transfer rates are possible in the backmixed cooling process and apparatus of the present invention because the heat transfer apparatus can tolerate very high superficial vapor velocities, velocities which could not be tolerated in a "thimble" heat transfer means connected with a bubbling dense bed. Preferably, the superficial vapor velocity in the "thimble" is in excess of 3.5 feet per second, and most preferably in the range of 4-10 fps. The superficial vapor velocities used in the thimble region can approach those used in the FFB region and will not upset flow patterns in the FFB region.

One very important benefit of using high superficial velocities in the heat exchange means is that the spent catalyst can be cooled while it is being regenerated. What damages the catalyst is high temperature steam, and much of this steam is the result of burning hydrocarbons or high hydrogen coke, sometimes called fast coke. The process and apparatus of the present invention permits the most damaging heat release, in terms of delta T and steam generation, to be conducted in intimate association with a heat exchange means which vigorously cools the catalyst.

Although use of a heat exchange tube bundle is preferred, it is also possible to use a jacketed cooler as the thimble vessel or to use heat pipes to transfer heat from the thimble to some other coolant.

The catalyst, after cooling by indirect heat exchange in the heat removal zone, is returned to the FFB region, preferably via the same opening used to add catalyst to the cooler from the FFB region. A natural convection patter will soon be established in each unit which allows for a rapid interchange of catalyst from the FFB region to the "thimble" and return. Generous sizing of the opening from the FFB region to the thimble, and use of a relatively short transfer line, one shorter than the depth of the "thimble" is preferred. Use of a narrower or longer transfer line will still be acceptable, but may lead to non-steady state operation, i.e. cycling operation in the thimble, with the thimble alternately filling and emptying.

For smoothest operation, the "thimble" should have an inlet line with a cross sectional area equal to at least 30% of the cross sectional area of the heat exchange means as measured at the thimble, and preferable an inlet cross sectional area of at least 50% of the heat exchange means cross sectional area. The inlet can be as large, or even larger, in equivalent diameter than the heat exchange means. The inlet should be no longer than the height of the heat exchange tube, or height of the jacket if a jacketed heat exchanger is used, and preferably the inlet is only 50% or less of the length of the active region of the heat exchanger.

Preferably the thimble inlet occupies from 5 to 40% of the cross sectional area of the FFB region. If the thimble inlet is any larger than this, there can be some interference with the normal flow of combustion air and spent catalyst into the FFB region. The thimble area should not be much smaller than 5% because insufficient heat removal will be achieved preferably the thimble inlet area ranges from 10 to 30%

We can make double use of the regeneration gas. A first (and conventional) use is adding enough air to burn coke from the catalyst. In our design the air also acts as a fluidizing medium which provides extremely high rates of heat transfer across any heat exchanger surface.

We achieve higher heat transfer rates by transferring heat in the FFB region of intense mixing.

FCC REACTOR CONDITIONS

Conventional riser cracking conditions may be used. Typical riser cracking reaction conditions include catalyst/oil ratios of 0.5:1 to 15:1 and preferably 3:1 to 8:1 and a catalyst contact time of 0.1 to 50 seconds, and preferably 0.5 to 5 seconds, and most preferably about 0.75 to 2 seconds, and riser top temperatures of 900 to about 1050° F.

CO COMBUSTION PROMOTER

Use of a CO combustion promoter in the regenerator or combustion zone is not essential for the practice of the present invention--however, it is preferred. These materials are known.

U.S. Pat. No. 4,072,600 and U.S. Pat. No. 4,235,754, which are incorporated by reference, disclose operation of an FCC regenerator with minute quantities of a CO combustion promoter. From 0.01 to 100 ppm Pt metal or enough other metal to give the same CO oxidation may be used with good results. Very good results are obtained with 0.1 to 10 wt. ppm platinum present on the catalyst in the unit.

BENEFITS OF THIMBLE COOLING THE COKE COMBUSTOR

We achieve economical heat transfer because we remove heat from catalyst without removing catalyst from the regenerator and without building supply and return lines. When the heat exchanger is in an open vessel connected to the bottom of the FFB region, it is possible to rely solely on natural fluid flow to transfer catalyst from the FFB region-down into the heat exchange vessel and to rely on the fluidizing air to transport the catalyst from the heat exchange vessel back into the FFB region.

Reduced temperature rise in the coke combustor is achieved because the catalyst is cooled somewhat in the coke combustor because of the catalyst cooler. Catalyst recycle (of hot regenerated catalyst) reduces the apparent coke concentration of the catalyst in the FFB region by dilution. Large amounts of recycled catalyst can be recycled to the coke combustor to achieve a high enough temperature to promote rapid coke combustion. This heats the incoming spent catalyst and promotes rapid coke combustion Thimble cooling cools some of the recycled regenerated catalyst and at least some of the partially regenerated catalyst This provides a double benefit in that some of the catalyst regeneration occurs in close proximity to a heat exchange surface, which greatly reduces localized steaming of catalyst. The second benefit is subcooling of at least some of the partially regenerated catalyst. This subcooled catalyst when returned to the coke combustor will not experience as high a transient temperature as it passes through the coke combustor and the transport riser, as compared to partially regenerated catalyst which has not passed through the heat exchanger.

The process and apparatus of the present invention also provides a way to reliably and smoothly remove heat from an H.E. R. regenerator during normal operation, without interfering with the startup of such a unit. If a low coke producing feed is fed to the FCC, the amount of fluidizing gas added to the heat exchanger may be greatly reduced, which will reduce or eliminate any significant amount of heat transfer. The heat exchange tubes will be covered by a dense, or slightly expanded bed of catalyst, and little heat transfer will occur.

To protect the heat exchange tubes from excessive erosion, it is best if the top of the tubes or tube bundle is recessed within the external cooler by an amount sufficient to provide at least 1 psi pressure difference between the top of the tube bundle and the air grid in the coke combustor. Preferably the mixture flowing down to the extrinsic cooler relative to the weight of coked catalyst added to the coke combustor within the range from 0.25:1 to 2:1.

We claim:

1. An apparatus for the simultaneous heating and cooling of coked fluidized catalytic cracking catalyst during high efficiency regeneration in a fluidized bed regeneration zone which comprises:
   a coke combustor vessel having an inlet for coked fluidized catalyst cracking catalyst, a first inlet for oxygen-containing regeneration gas, an inlet for a recycled regenerated catalyst stream, and an outlet in an upper portion thereof for discharging a dilute phase mixture of catalyst and regeneration gas from said coke combustor;
   a dilute phase transport riser having an inlet and lower portion thereof connected to said coke combustor outlet and an outlet in an upper portion thereof connected with a catalyst/gas separation means;
   a collection vessel above said coke combustor enclosing said riser;
   said catalyst/gas separation means receiving and separating said dilute phase catalyst/gas stream discharged from said transport riser and discharging resulting separated catalyst into said collection vessel, said collection vessel having means for maintaining said separated catalyst as a fluidized bed of catalyst;
   a catalyst recycle means for recycling separated catalyst from said fluidized bed in said collection vessel to said first inlet; and
   a generally vertical extrinsic heat removal means, having an equivalent diameter, beneath and in open fluid communication with said coke combustor, said heat removal means connected to said coke combustor by an inlet tube having an inlet tube equivalent diameter equal to at least 75% of the equivalent diameter of said extrinsic heat removal means, said heat removal means further comprising at least one fluidizing gas inlet means in a flower portion thereof for adding fluidizing gas to said extrinsic heat removal means to fluidize and displace catalyst from said heat removal means up into said coke combustor via said inlet tube.

2. The apparatus of claim 1 wherein said extrinsic cooler comprises heat exchange tubes having a top portion, said coke combustor comprises an air grid and the top of said heat exchange tubes is recessed within said extrinsic cooler.

3. The apparatus of claim 1 wherein said coke combustor has a cross sectional area and said inlet tube of said extrinsic heat removal means has a cross sectional area of 5 to 40% of the cross sectional area of the coke combustor.

4. The apparatus of claim 1 wherein said coke combustor has a cross sectional area and said inlet tube of said extrinsic heat removal means has a cross sectional area of 10 to 30% of the cross sectional area of the coke combustor.

5. The apparatus of claim 2 wherein said heat exchanger tubes have a height and said inlet tube of said extrinsic heat removal means has a length no longer than the height of said heat exchanger tubes.

6. The apparatus of claim 2 wherein said heat exchanger tubes have a height and said inlet tube of said extrinsic heat removal means has a length no longer than 50% of the height of said heat exchanger tubes.

* * * * *